(12) United States Patent
Shin et al.

(10) Patent No.: US 8,988,762 B2
(45) Date of Patent: Mar. 24, 2015

(54) ELECTROPHORETIC DISPLAY DEVICE AND METHOD FOR MANUFACTURING THE SAME

(75) Inventors: Sang Il Shin, Gyeonggi-do (KR); Yong In Park, Gyeonggi-do (KR); Seung Han Paek, Gyeonggi-Do (KR); Choon Ho Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 459 days.

(21) Appl. No.: 13/173,679

(22) Filed: Jun. 30, 2011

(65) Prior Publication Data

US 2012/0008190 A1    Jan. 12, 2012

(30) Foreign Application Priority Data

Jul. 12, 2010  (KR) .................. 10-2010-0066806
Sep. 28, 2010  (KR) .................. 10-2010-0093668

(51) Int. Cl.
G02B 26/00  (2006.01)
G09G 3/34   (2006.01)
G02F 1/133  (2006.01)
G02F 1/167  (2006.01)

(52) U.S. Cl.
CPC ............ *G02F 1/167* (2013.01); *G02F 2201/50* (2013.01); *G02F 2202/02* (2013.01)
USPC ................................ 359/296; 430/31; 349/33

(58) Field of Classification Search
USPC ............... 359/296; 349/33; 345/49, 105, 107; 430/31–32
See application file for complete search history.

(56) References Cited

U.S. PATENT DOCUMENTS

| 6,524,153 | B1 | 2/2003 | Ikeda et al. | |
| 8,149,498 | B2* | 4/2012 | Hsieh et al. | 359/296 |
| 2004/0027327 | A1* | 2/2004 | LeCain et al. | 345/107 |
| 2004/0145561 | A1* | 7/2004 | Ikeda | 345/107 |
| 2005/0267235 | A1 | 12/2005 | Minami | |
| 2006/0063207 | A1 | 3/2006 | Lin et al. | |
| 2007/0164983 | A1* | 7/2007 | Hamaguchi | 345/107 |

(Continued)

FOREIGN PATENT DOCUMENTS

| CN | 101520587 A | 9/2009 |
| CN | 101762924 A | 6/2010 |

(Continued)

OTHER PUBLICATIONS

The First Office Action dated Dec. 11, 2013 from the Taiwan Advance Patent & Trademark Office in counterpart Taiwanese application No. 100124347.

*Primary Examiner* — Dawayne A Pinkney
(74) *Attorney, Agent, or Firm* — Morgan, Lewis & Bockius LLP

(57) ABSTRACT

An electrophoretic display device includes a lower substrate having a plurality of pixel electrodes on the lower substrate, having a lower organic layer on the pixel electrodes and the lower substrate, and having partition walls formed on the lower organic layer to surround the pixel electrodes, the pixel electrodes and partition walls defining a plurality of sub-pixels; an upper substrate bonded with the lower substrate, the upper substrate having a common electrode formed thereon with an upper organic layer on the common electrode; and electrophoretic dispersion liquid comprising a plurality of charged particles colored to display colors, the electrophoretic dispersion liquid disposed in the plurality of the sub-pixels defined by the pixel electrodes and the partition walls.

4 Claims, 8 Drawing Sheets

(56) References Cited

U.S. PATENT DOCUMENTS

| | | |
|---|---|---|
| 2008/0110862 A1 | 5/2008 | Kim et al. |
| 2008/0136773 A1* | 6/2008 | Kim et al. .................. 345/107 |
| 2009/0109520 A1 | 4/2009 | Park et al. |
| 2010/0156779 A1 | 6/2010 | Park et al. |
| 2010/0157412 A1* | 6/2010 | Lee et al. .................. 359/296 |
| 2010/0224872 A1* | 9/2010 | Kimura ....................... 257/43 |
| 2011/0075248 A1 | 3/2011 | LeCain et al. |

FOREIGN PATENT DOCUMENTS

| | | |
|---|---|---|
| JP | 2005-345568 A | 12/2005 |
| KR | 10-2009-0041795 | 4/2009 |
| TW | 200821663 A | 5/2008 |

* cited by examiner

< Error Generated By Incomplete Filling of Electrophoretic
Dispersion Liquid & Error Generated By Vapor >

ELECTROPHORETIC DISPLAY DEVICE AND METHOD FOR MANUFACTURING THE SAME

CROSS REFERENCE TO RELATED APPLICATIONS

This application claims the benefit of the Patent Korean Application No. 10-2010-0066806, filed on Jul. 12, 2010 and 10-2010-0093668, filed on Sep. 28, 2010, both of which are hereby incorporated by reference as if fully set forth herein.

BACKGROUND OF THE DISCLOSURE

1. Field of the Disclosure

The present invention relates to an electrophoretic display device, and more particularly, to an electrophoretic display device which includes electrophoretic dispersion liquid internalized on a lower substrate, and a method for manufacturing the same.

2. Discussion of the Related Art

In general, an electrophoretic display device refers to a device capable of displaying images using electrophoresis wherein colored charge particles are moved by an electric field applied from the outside. Here, 'electrophoresis' means a phenomenon that charged particles are moved in electrophoretic dispersion liquid (electrophoretic ink) by coulomb forces when an electric field is applied to the electrophoretic dispersion liquid having the charged particles dispersed therein.

An electrophoretic display device using electrophoresis has a bistability that allows original images to be displayed for a relatively long time even if an applied voltage is removed. In other words, the electrophoretic display device can maintain a specific screen for a relatively long time without voltages being continuously applied thereto. As a result, the electrophoretic display device may be applied to e-books which do not require quick changes of screens.

Moreover, an electrophoretic display device has no dependence on viewing angle and can provide images that are comfortable to eyes remarkably enough to be similar to paper, unlike a liquid crystal display device. As a result, demands for the electrophoretic display devices have been increasing.

FIG. 1 is a sectional view illustrating a structure of a display device according to the related art.

With reference to FIG. 1, an electrophoretic display device includes lower and upper substrates 10 and 20 bonded to each other with an electrophoretic film 30 disposed between the lower substrate 10 and the upper substrate 20. The electrophoretic film 30 includes first and second adhesive layers 34 and 36 formed of a transparent material, a common electrode 38 formed of a transparent conductive material, and a plurality of microcapsules 32 having electrophoretic dispersion liquid therein.

Although not shown in FIG. 1, a plurality of pixel electrodes (not shown) are formed on the lower substrate 10 opposite to the common electrode 38 that is formed on the upper substrate. A plurality of thin film transistors (TFT, not shown) are also formed on the lower substrate 10 to apply voltages to the plurality of the pixel electrodes as switching devices. Microcapsules 32 are provided with electrophoretic dispersion liquid (electrophoretic ink). The electrophoretic ink includes positive (+) charged particles and negative (−) charged particles provided therein. The charged particles provided in the microcapsule 32 are moved by electrophoresis, thereby presenting an image.

In the related art electrophoretic display device, the upper substrate 20, the lower substrate 10 and the lamination type electrophoretic film 30 are manufactured separately. After that, the electrophoretic film 30 is disposed between the lower substrate 10 and the upper substrate 20.

The electrophoretic film 30 is attached to the upper substrate 20 and a release film is kept attached to a first adhesive layer 34. Just before it is laminated on the lower substrate 10, the release film is eliminated. After that, the electrophoretic film 30 is attached to the lower substrate 10 by the first adhesive layer 34.

As a result, the lower substrate 10, the upper substrate 20 and the electrophoretic film 30 have to be manufactured separately and the manufacturing process of the related art electrophoretic display device is disadvantageously complicated. Thus, the manufacturing of the electrophoretic display device requires a lot of time and productivity deteriorates. The electrophoretic film 30 additionally has to be manufactured and production cost is increased.

To overcome the disadvantages of the related art electrophoretic display device, technology that enables the electrophoretic layer to be internalized in the lower substrate has been proposed. However, a structure and a manufacturing process technology for internalizing the electrophoretic layer on the lower substrate have not been developed to levels to address such problems. As a result, it is difficult to apply the technology to actual production.

The related art electrophoretic display device has a further disadvantage of lost charging properties of the charged particles filled into cells provided in the lower substrate. As a result, stability and driving reliability of the charged particles is reduced. In addition, contrast of pixels is deteriorated and a display quality might be deteriorated accordingly.

SUMMARY OF THE INVENTION

Accordingly, the present invention is directed to an electrophoretic display device and a method for manufacturing the same.

An object of the present invention is to provide an electrophoretic display device to enhance manufacturing efficiency, and a method for manufacturing the electrophoretic display device.

Another object of the present invention is to provide an electrophoretic display device to reduce production cost, and a method for manufacturing the electrophoretic display device.

A further object of the present invention is to provide an electrophoretic display device which includes a lower substrate having electrophoretic dispersion liquid internalized therein, and a method for manufacturing the electrophoretic display device.

A still further object of the present invention is to provide an electrophoretic display device to internalize electrophoretic dispersion liquid in the lower substrate, and a method for manufacturing the electrophoretic display device.

A still further object of the present invention is to provide an electrophoretic display device having a high display quality, and a method for manufacturing the electrophoretic display device.

A still further object of the present invention is to provide an electrophoretic display device to enhance production reliability, and a method for manufacturing the electrophoretic display device.

A still further object of the present invention is to provide an electrophoretic display device to present various color images, and a method for manufacturing the electrophoretic display device.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, an electrophoretic display device comprises a lower substrate having a plurality of pixel electrodes on the lower substrate, having a lower organic layer on the pixel electrodes and the lower substrate, and having partition walls formed on the lower organic layer to surround the pixel electrodes, the pixel electrodes and partition walls defining a plurality of sub-pixels; an upper substrate bonded with the lower substrate, the upper substrate having a common electrode formed thereon with an upper organic layer on the common electrode; and electrophoretic dispersion liquid comprising a plurality of charged particles colored to display colors, the electrophoretic dispersion liquid disposed in the plurality of the sub-pixels defined by the pixel electrodes and the partition walls.

In another aspect, an electrophoretic display device comprises a lower substrate having a plurality of pixel electrodes and partition walls thereon, the partition walls surrounding the pixel electrodes to define a plurality of sub-pixels, and a lower interlayer formed on the pixel electrodes and the partition walls; an upper substrate bonded with the lower substrate, the upper substrate having a common electrode formed thereon with an upper interlayer on the common electrode; and an electrophoretic dispersion liquid comprising a plurality of charged particles colored to display colors, the electrophoretic dispersion liquid disposed in the plurality of the sub-pixels defined by the pixel electrodes and surrounded by the partition walls; wherein the upper and lower interlayers are formed of organic materials.

In another aspect, an electrophoretic display device comprises a lower substrate having a plurality of pixel electrodes on the lower substrate and partition walls formed surrounding the pixel electrodes, the pixel electrodes and partition walls defining a plurality of sub-pixels; an upper substrate bonded with the lower substrate, the upper substrate having a common electrode formed thereon with an organic layer on the common electrode, and electrophoretic dispersion liquid comprising a plurality of charged particles colored to display colors, the electrophoretic dispersion liquid disposed in the plurality of the sub-pixels defined by the pixel electrodes and the partition walls, wherein surfaces of each of the pixel electrode and the partition walls in direct contact with the electrophoretic dispersion liquid have an organic material.

The present invention provides a number of advantages. For example, the present invention enhances manufacturing efficiency of an electrophoretic display device. The present invention also reduces production cost of an electrophoretic display device. Further, the present invention provides an electrophoretic display device that includes a lower substrate having electrophoretic dispersion liquid internalized therein. Moreover, the present invention provides a method for manufacturing an electrophoretic display device that internalizes electrophoretic dispersion liquid in a lower substrate of the electrophoretic display. The present invention enhances production reliability of an electrophoretic display device. Also, the present invention enhances a display quality of an electrophoretic display device. The present invention may provide an electrophoretic display device that can present various color images, and a method for manufacturing the electrophoretic display device. And, the present invention may provide an electrophoretic display device that can enhance stability and driving reliability of charged particles internalized on the lower substrate, and a method for manufacturing the electrophoretic display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE INVENTION

Reference will now be made in detail to the specific embodiments of the present invention, examples of which are illustrated in the accompanying drawings. Wherever possible, the same reference numbers will be used throughout the drawings to refer to the same or like parts. As follows, an electrophoretic display device and a method for manufacturing the electrophoretic display device according to exemplary embodiments of the present invention will be described in detail in reference to the accompanying drawings. When the disclosure of the embodiments of the present invention states that a structure is formed 'on' or 'below' another structure, this disclosure should be interpreted to include the structures being in contact with each other as well as there being a third structure is disposed between the structures.

Figure 1:
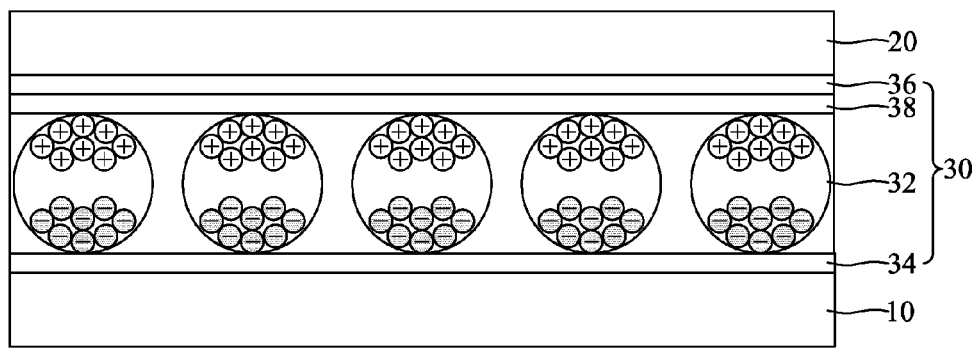
FIG. 1 is a sectional view illustrating a structure of a electrophoretic display device according to the related art.

The present invention may be applied to all types of electrophoretic display devices, regardless of color presentation. As follows, a color type electrophoretic display device is embodied to explain an exemplary embodiment of the present invention. The exemplary embodiment that will be disclosed may be applied to a mono-type electrophoretic display device, an electrophoretic display device including a color filter, and an electrophoretic display device including charged particles colored with one of red, blue, green, yellow, cyan, magenta, black and white. The present invention may be applied to not only a microcapsule type electrophoretic display devices of FIG. 1 but also all types of electrophoretic display device including a microcup type electrophoretic display device identically. As follows, the microcup type electrophoretic display device will be embodied to explain an exemplary embodiment of the present invention.

Figure 2:
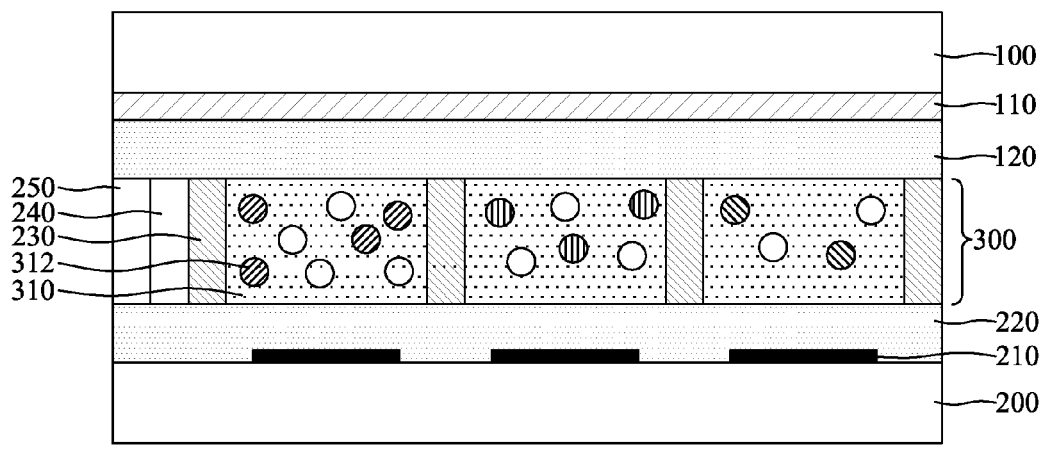
FIG. 2 is a sectional view schematically illustrating a structure of an electrophoretic display device according to a first exemplary embodiment of the present invention.

FIG. 2 is a diagram schematically illustrating a structure of an electrophoretic display device according to an exemplary first embodiment of the present invention.

With reference to FIG. 2, the electrophoretic display device according to the first exemplary embodiment of the present invention includes an upper substrate 100 having a common electrode 110, a lower substrate 200 having a plurality of pixel electrodes 210, partition walls 230 located between the upper substrate 100 and the lower substrate 200 to define a plurality of sub-pixels, and an electrophoretic layer 300 having electrophoretic dispersion liquid 310 filled into the sub-pixels defined by the partition walls 230. Charged particles 312 of the electrophoretic dispersion liquid 310 filled into the sub-pixels may be moved within a dielectric solvent by voltages applied to the common electrode 110 and the plurality of the pixel electrodes 210, thereby presenting mono-images and color-images.

The upper substrate 100 includes a base substrate (a film) formed of transparent glass or plastic, the common electrode 110 formed on the base substrate and a polymer layer 120 formed on the common electrode 110. Here, the base substrate and the common electrode 110 that compose the upper substrate 100 should be transparent to display images. The base substrate may be formed of a flexible transparent material. The common electrode 110 may be formed of a conductive transparent material, for example, indium tin oxide (ITO) or indium zinc oxide (IZO).

A first polymer layer 120 of the upper substrate 100 may polarize the upper substrate 100 and protect the common electrode 110. In addition, the first polymer layer 120 enables the electrophoretic layer 300 to be bonded with the upper substrate 100 smoothly. Here, the first polymer layer 120 may be formed with a predetermined thickness of 1 nm~3,000 nm. The first polymer layer 120 is formed of an organic material including insulative high polymer of, for example, polyimide, polyvinylphenol or polyvinylalcohol.

The lower substrate 200 includes a plurality of gate lines (not shown) and a plurality of data lines (not shown). In addition, the lower substrate 200 includes a plurality of thin film transistors (not shown, hereinafter 'TFT') formed in intersections between the plurality of the gate lines and the plurality of the data lines, corresponding to the plurality of the sub-pixels (color-sub-pixels and mono-sub-pixels) defined by the partition walls 230, the plurality of the pixel voltages 210 configured to apply voltages to the plurality of the sub-pixels by switching of the TFT. The lower substrate 200 may include a transparent glass substrate, a plastic substrate with flexibility or a metal substrate. The lower substrate 200 does not necessarily have to be transparent because it is located on a side opposite to a screen displaying images.

Each of the gate and data lines may be a single layer with low resistivity formed of, for example, silver (Ag), aluminum (Al) or alloy of Ag and Al. Alternatively, a multilayer may be used including such a single layer and another layer with good electrical characteristics formed of chrome (Cr), titanium (Ti), tantalum (Ta) or other suitable material.

A gate insulation layer of a nitride layer or other suitable material may be located between the gate line and the data line. A thin film transistor (TFT) is formed at every intersection between the gate lines and the data lines. Here, gate electrodes of the thin film transistors (TFT) may be connected with the gate lines and source electrodes of the thin film transistors (TFT) may be connected with the data lines. Drain electrodes of the thin film transistors (TFT) may be connected with the pixel electrodes 210.

A second polymer layer 220 is formed covering the pixel electrodes 210 to polarize the lower substrate 200. In addition, the second polymer layer 220 protects the pixel electrodes 210 and enables the electrophoretic layer 300 to be bonded with the lower substrate smoothly. Here, the second polymer layer 220 may be formed with a predetermined thickness of 1 nm~3,000 nm. The second polymer layer 220 is formed of an organic material having a high polymer of, for example, polyimide, polyvinylphenol or polyvinylalcohol, to have identical physical properties as the physical properties of the electrophoretic dispersion liquid 310.

The pixel electrodes 210 are electrically connected with the drain electrodes of the thin film transistors via contact holes, respectively. The pixel electrode 210 may be formed of a predetermined material, for example, copper, aluminum and indium tin oxide (ITO). Alternatively, the pixel electrode 210 may be formed by multilayering nickel and/or gold on the copper, aluminum or indium tin oxide (ITO) layer.

The electrophoretic layer 300 includes the partition walls 130 defining the plurality of the sub-pixels and the electrophoretic dispersion liquid (electrophroetic ink) 310 internalized on each of the sub-pixels defined by the partition walls 230. The partition walls 230 are formed on the upper substrate 100 or the lower substrate 200 and define the plurality of the sub-pixels. That is, the partition walls 230 surround the pixel electrodes 210 to define the plurality of the pixels areas.

The first exemplary embodiment shown in FIG. 2 presents the partition walls 230 formed on the lower substrate 200. Here, the plurality of the sub-pixels may be configured of color-sub-pixels and/or mono-sub-pixels.

The electrophoretic dispersion liquid 310 including the plurality of the charged particles 312 and the dielectric solvent 160 may be internalized in the sub-pixels defined by the partition walls 230. The electrophoretic dispersion liquid 310 may be internalized in the sub-pixels on the lower substrate 200 according to a die coating method, a casting method, a bar coating method, a slit coating method, a dispensing method, a squeezing method, a screen printing method, an inkjet printing method or a photolithography method.

The partition walls 230 are formed on the lower substrate 200. Specifically, the partition walls 230 are formed on the second polymer layer 220 of the lower substrate 200, toward the upper substrate 100. At this time, the partition walls 230, first polymer layer 120 and second polymer layer 220 may be formed of an non polar organic material including an non polar insulative polymer to have identical physical properties as the electrophoretic dispersion liquid 310. The non polar organic material for the partition walls 230, first polymer layer 120 and second polymer layer 220 may prevent the charged particles 312 from attaching to the partition walls 230, first polymer layer 120 and second polymer layer 220. The partition walls 230 may be formed to have a height of 1 um~100 um, in a photolithography process or a mold printing process. Here, the partition walls 230 may be formed on the lower substrate 200 as a single structure to be contiguous.

The partition walls 230 may be formed on the second polymer layer 220. According to another embodiment, the partition walls 230 and the second polymer layer 220 may be formed as follows. According to this embodiment, the partition wall 230 is formed on the base substrate having the TFT and pixel electrodes 210 formed thereon. After that, the electrophoretic dispersion liquid 310 is filled into the sub-pixels defined by the partition walls 230 and the second polymer layer 220 may be then formed.

The electrophoretic dispersion liquid 310 includes the plurality of positive (+) or negative (−) charged particles 312. That is, some of the charged particles 312 are charged to have a positive (+) pole and the others are charged to have a negative (−) pole. The charged particles 312 may be colored with at least one of red, blue, green, yellow, cyan, magenta, black and white colors. The dielectric solvent may use halogenated solvents, saturated hydrocarbons, silicone oils, low molecular weight halogen-containing polymers, epoxides, vinyl ester, aromatic hydrocarbon, toluene, naphthalene, paraffinic liquids, poly chlorotrifluoroethylene polymers, or other suitable material.

A sealant 240 configured to bond the upper and lower substrate 100 and 200 with each other may be formed of a predetermined material that can be hardened using ultraviolet (UV) rays and heat. The upper substrate 100 and the lower substrate 200 are bonded by the sealant 240 with the electrophoretic layer 300 located there between.

After that, the electrophoretic dispersion liquid 310 filled into the sub-pixels is surrounded by the partition walls 230, the polymer layer 120 of the upper substrate 100 and the polymer layer 220 of the lower substrate 200.

When forming the sealant 240 for the bonding process, the sealant 240 might overflow to an outer portion of the lower substrate 200. To prevent this overflow, a dam 250 is formed in an outer portion with respect to the sealant 240 formed on the lower substrate 200 according to this embodiment of the present invention. Here, the size of the dam 250 may be variable according to the quantity of the sealant. For example, the dam 250 may be formed with a height of 1 um~100 um and a width of 10 um~5,000 um. The dam 250 may have a plurality of lines, for example, 1 to 5 lines. Thus, the dam 250 may be formed together with the partition walls 230 or independently in a separate process.

Figure 3:
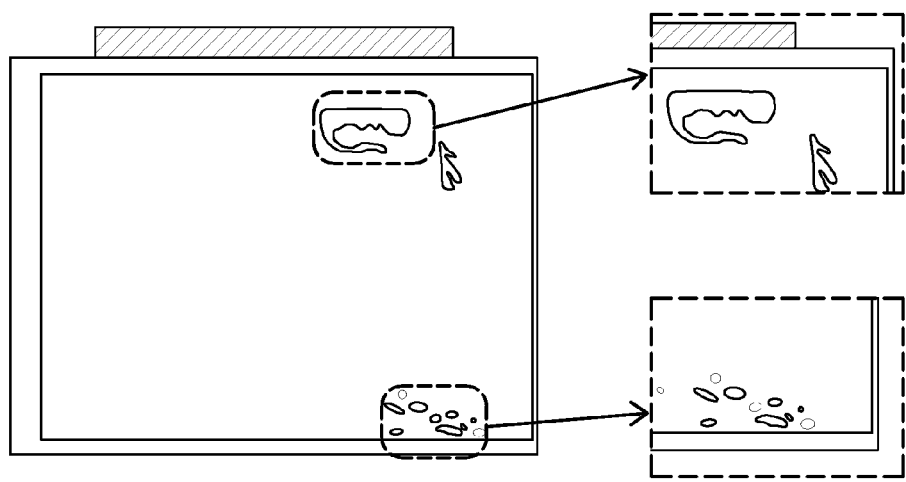
FIG. 3 is a diagram illustrating errors generated by incomplete filling of electrophoretic dispersion liquid and by vapors, respectively.

With reference to FIG. 3, if physical properties such as non polarity possessed by an outer wall surrounding the electrophoretic dispersion liquid 310 are not identical to the physical properties possessed by the electrophoretic dispersion liquid 310, the electrophoretic dispersion liquid 310 fails to be precisely filled. As a result, incomplete filling generated by imprecise filling and errors caused by vapors generated in the filling process may occur.

As mentioned above, according to this exemplary embodiment of the present invention, the physical properties of the outer walls surrounding the electrophoretic dispersion liquid 310 internalized on the lower substrate 200, that is, the partition walls 230, are identical to the physical properties of the first polymer layer 120 of the upper substrate 100 and those of the second polymer layer 220 of the lower substrate 200. To achieve the identical physical properties, non polar organic materials are used for the partition walls 230, the first and second polymer layers 120, 220, and the electrophoretic dispersion liquid 310. As a result, the internalization process of the electrophoretic dispersion liquid 310 on the lower substrate 120 may be performed smoothly.

Since the electrophoretic dispersion liquid 310 is internalized on the lower substrate 200, a driving ability of the electrophoretic display device is enhanced. The charged particles 312 colored with a variety of colors may enable various color images presented on a screen. As a result, a display quality of the electrophoretic display device is enhanced.

Figure 4:
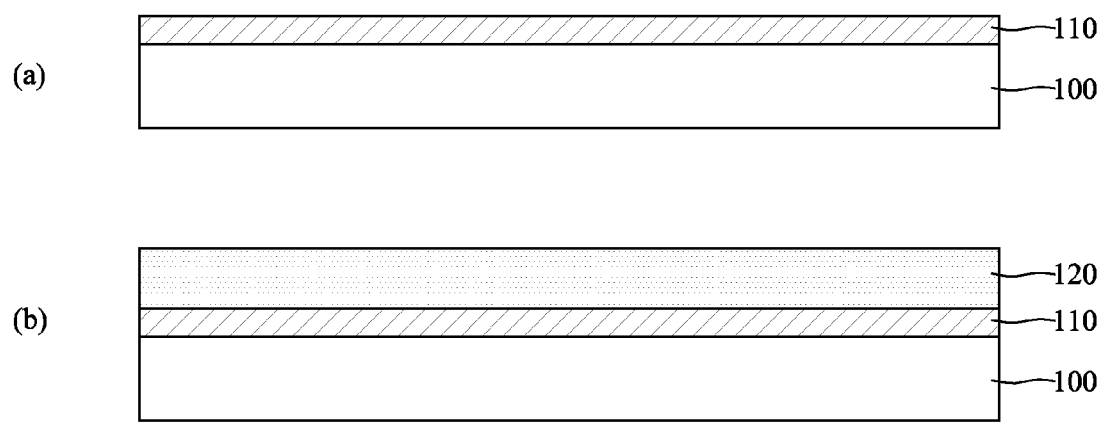
FIG. 4 is a diagram illustrating a method for manufacturing an upper substrate of the electrophoretic display device according to a first embodiment of the present invention.
Figure 5:
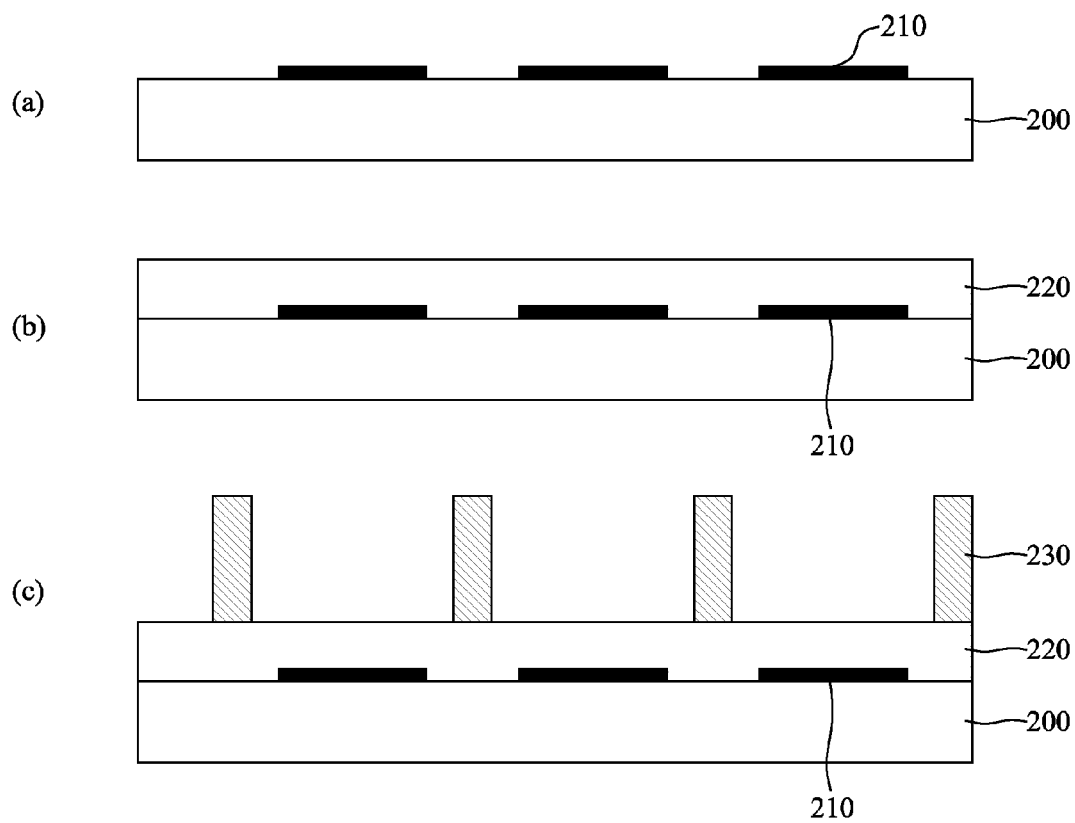
FIG. 5 is a diagram illustrating a method for manufacturing a lower substrate of the electrophoretic display device according to a second exemplary embodiment of the present invention.
Figure 6:
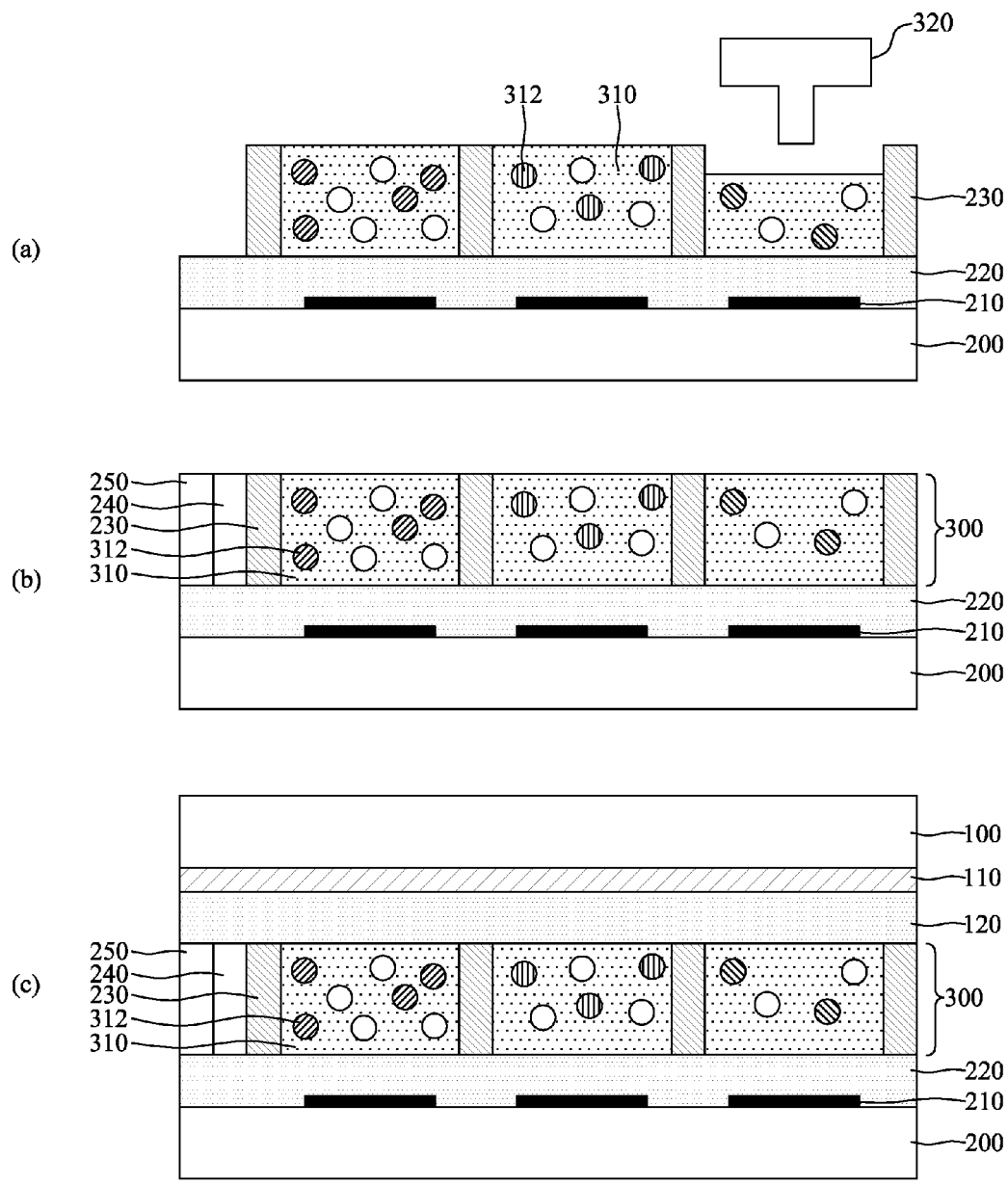
FIG. 6 is a diagram illustrating a process performed to internalize electrophoretic dispersion liquid on the lower substrate provided in the electrophoretic display device according to the first exemplary embodiment of the present invention.

As follows, a method for manufacturing the electrophoretic display device according to the first exemplary embodiment of the present invention will be described in reference to FIGS. 4 to 6. FIG. 4 is a diagram illustrating a method for manufacturing the upper substrate of the electrophoretic display device according to the first exemplary embodiment of the present invention. FIG. 5 is a diagram illustrating a method for manufacturing the lower substrate of the electrophoretic display device according to the first exemplary embodiment of the present invention. FIG. 6 is a diagram illustrating a process performed to internalize electrophoretic dispersion liquid on the lower substrate provided in the electrophoretic display device according to the first exemplary embodiment of the present invention.

As shown in FIG. 4(a), a conductive material, such as indium tin oxide (ITO) or indium zinc oxide (IZO), is provided on the base substrate (the film) formed of transparent glass or flexible transparent plastic, to form the common electrode 110.

Then, as shown in FIG. 4(b), the first polymer layer 120 is formed on the common electrode 110 with a thickness of 1 nm~3,000 nm. Here, the first polymer layer 120 polarizes the upper substrate 100 and protects the common electrode 110. In addition, the first polymer layer 120 enables the electrophoretic layer to be bonded to the upper substrate 100 in a subsequent process, which will be described later.

At this time, the polymer layer 120 contacts the electrophoretic dispersion liquid 310 filled into the sub-pixels. The polymer layer 120 is formed of an organic material having high polymer of, for example, polyimide, polyvinylphenol or polyvinylalcohol, to have physical properties to physical properties identical of the electrophoretic dispersion liquid 310.

Hence, as shown in FIG. 5(a), copper, aluminum or ITO material is coated on the base substrate (the film) having the thin film transistors (TFT) formed thereon corresponding to the plurality of sub-pixels. After that, the coated copper, aluminum or ITO material is patterned in a photolithography process to form the plurality of pixel electrodes 210 corresponding to the plurality of the sub-pixels, respectively. Here, to form the pixel electrodes 210, a nickel and/or gold may be further multilayered on the copper, aluminum or ITO material. The plurality of the sub-pixels may be defined by the partition walls 230 which will be manufactured in a following process.

Although not shown in the drawings, the gate and data lines are formed on the base substrate. The thin film transistors (TFT) are formed at respective intersections of the gate lines and the data lines. The data lines are connected with source electrodes of the TFTs and the gate lines are connected with gate electrodes of the TFTs. The pixel electrodes 210 are electrically connected with drain electrodes of the TFT via contact holes.

As shown in FIG. 5(b), the second polymer layer 220 is formed on the pixel electrodes 210 with a thickness of 1 nm~3,000 nm.

Here, the second polymer layer 220 planarizes the lower substrate 200 and protects the pixel electrodes 210. In addition, the second polymer layer 220 enables the electrophoretic layer 300 to be bonded to the lower substrate 200 smoothly in a process that will be described later.

At this time, the second polymer layer 220 contacts the electrophoretic dispersion liquid 310 filled into the sub-pixels. (FIG. 2) As a result, the second polymer layer 220 is formed of an organic material including insulative polymer, for example, of polyimide, polyvinylphenol or polyvinylalcohol, to have physical properties identical to physical properties of the electrophoretic dispersion liquid 310.

As shown in FIG. 5(c), the partition walls 230 are formed of an non polar organic material including non polar insulative polymer to have physical properties identical to the physical properties of the electrophoretic dispersion liquid 310, which will be described in detail later. Here, the partition walls 230 are formed on the second polymer layer 220. The partition walls 230 may be formed in a photolithography or mold printing process with a height of 1 um~100 um. The partition walls 230 define the sub-pixels to be filled with the electrophoretic dispersion liquid 310.

After that, as shown in FIG. 6(a), the electrophoretic dispersion liquid 310 having the plurality of the charged particles 312 charged to have a positive pole (+) or a negative pole (−) are filled into the sub-pixels defined by the partition walls 230. As a result, the electrophoretic dispersion liquid 310 may be internalized on the lower substrate 200.

Here, the electrophoretic dispersion liquid 310 may be internalized in the sub-pixels formed on the lower substrate 200 according to a die coating method, a casting method, a bar coating method, a slit coating method, a dispense method, a squeezing method, a screen printing method, an inkjet printing method, a photolithography method, or other suitable method.

An embodiment shown in FIG. 6(a) presents that a dispenser 320 dispenses the electrophoretic dispersion liquid 310 in the sub-pixels.

According to the above described exemplary embodiment, the partition walls 230 are formed on the second polymer layer 220 and the electrophoretic dispersion liquid 310 is filled into the sub-pixels defined by the partition walls 230. According to another exemplary embodiment, the partition walls 230 and the second polymer layer 220 will be formed as follows.

According to a further exemplary embodiment of the present invention, the partition walls 230 are formed on a base substrate having TFT and pixel electrodes 210 formed thereon. After that, the electrophoretic dispersion liquid 310 is filled in to sub-pixels defined by the partition walls 230 and the second polymer layer 220 may be then formed on the partition walls 230.

After that, as shown in FIG. 6(b), the sealant 240 is coated on an outer portion of the lower substrate 200 where the sub-pixels are not formed. Here, the sealant 240 may be formed of a material which can be hardened by UV rays and heat. However, the sealant 240 might overflow into the outer portion of the lower substrate 200. In this embodiment, a dam 250 is formed outside the sealant 240 formed on the lower substrate 200. Here, the size of the dam 250 may vary according to the quantity of the sealant 240. For example, the dam 250 may have a height of 1 µm~100 µm and a predetermined width of 10 µm~5,000 µm. A plurality of lines may be formed in the dam 250, for example, 1 to 5 lines. The dam 250 may be formed together with the partition walls 230 in the same process or it may be formed in a separate process.

As shown in FIG. 6(C), the upper substrate 100 and the lower substrate 200 are bonded to each other by the sealant 240 with the electrophoretic layer 300 formed in the above process being located there between.

After that, the electrophoretic dispersion liquid 310 filled into the sub-pixels may be surrounded by the partition walls 230, the first polymer layer 120 of the upper substrate 100 and the second polymer layer 220 of the lower substrate 200.

At this time, an outer wall surrounding the electrophoretic dispersion liquid 310, that is, the partition walls 230, the first polymer layer 120 of the upper substrate 100 and the second polymer layer 220 of the lower substrate 200 may be formed of an organic material including an insulative polymer having physical properties identical to the physical properties of the electrophoretic dispersion liquid 310.

As a result, the process performed to internalize the electrophoretic dispersion liquid 310 on the lower substrate 200 may be performed smoothly. In addition, when bonding the upper and lower substrates 100 and 200 to each other, errors generated in the sub-pixels can be prevented and production efficiency of the electrophoretic display device is enhanced.

Figure 7:
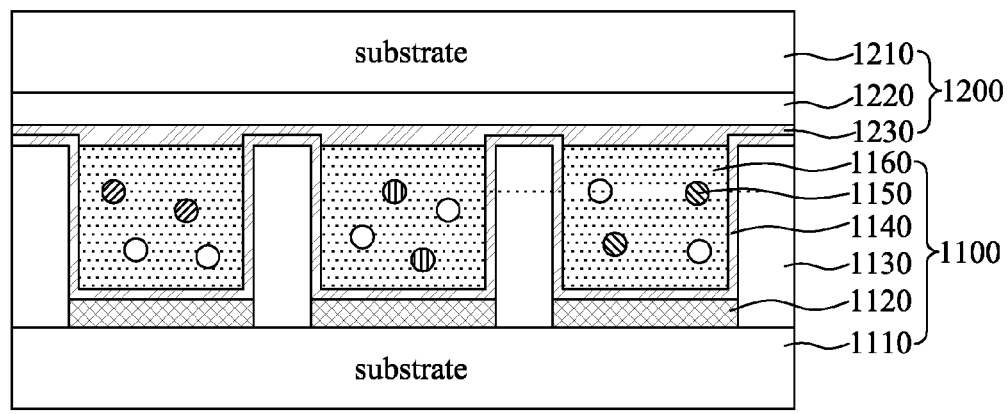
FIG. 7 is a sectional view illustrating an electrophoretic display device according to a second exemplary embodiment of the present invention.

As follows, an electrophoretic display device according to a second exemplary embodiment of the present invention and a method for manufacturing the same will be described with reference to FIGS. 7 to 15. When describing the second exemplary embodiment, detailed description of substantially the same components and manufacturing processes as those of the first exemplary embodiment will be omitted. FIG. 7 is a sectional view illustrating an electrophoretic display device according to a second exemplary embodiment of the present invention and FIG. 8 is a plane view illustrating a lower substrate provided in the electrophoretic display device according to the second exemplary embodiment of the present invention.

Figure 8:
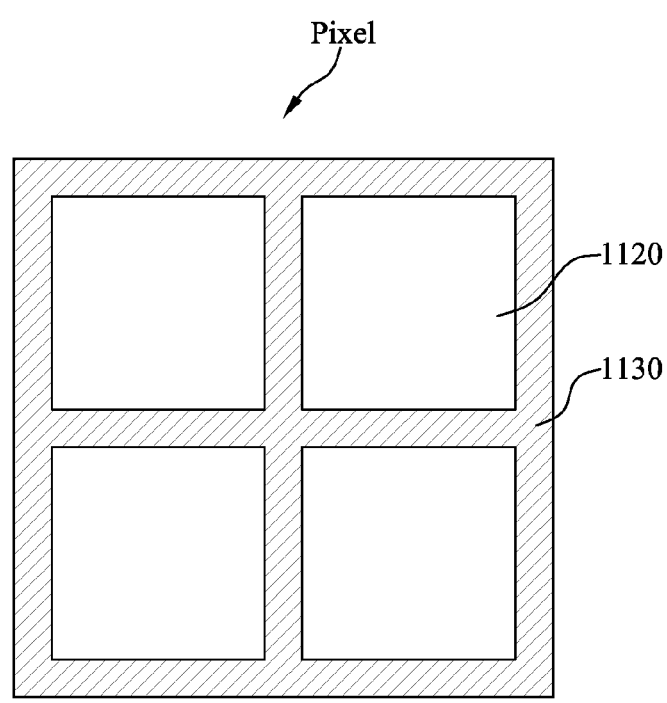
FIG. 8 is a plane view illustrating a lower substrate provided in the electrophoretic display device according to the second exemplary embodiment of the present invention.

With reference to FIGS. 7 and 8, the electrophoretic display device according to the second exemplary embodiment of the present invention includes an upper substrate 1200 and a lower substrate 1100 having electrophoretic dispersion liquid internalized thereon.

The lower substrate 1100 includes a lower base substrate 1110, a plurality of pixel electrodes 1120 formed on the lower base substrate 1110, partition walls 1130 formed to surround the plurality of the pixel electrodes 1120 to define a plurality of pixel areas, a lower interlayer 1140 formed on inner walls of the partition walls 1130 and the pixel electrodes 1120, and electrophoretic dispersion liquid filled into filled-cells of the plurality of the pixel areas defined by the partition walls 1130.

The electrophoretic dispersion liquid is filled into the pixel areas (the filled-cells) defined by the partition walls 1130. At this time, the lower interlayer 1140 is formed in the pixel areas such that charged particles 1150 of the electrophoretic dispersion liquid may be separated from the pixel electrodes 1120 and the partition walls 1130 physically. The partition walls 1130 are formed on the lower substrate 1100 to define the pixel areas and to define the cells that will be filled with the electrophoretic dispersion liquid. At this time, the partition wall 1130 is formed to have a height of 10 µm~100 µm and a width of 5 µm~30 µm. Here, the partition walls 1130 are formed of an organic material, such as a polymer, to have physical properties identical to those of the electrophoretic dispersion liquid. The partition walls 1130 may be formed on the lower substrate 1100 as a single structure to be continuous.

The lower interlayer 1140 is formed on inner walls of the partition walls 1130 and the pixel electrodes 1120 to surround the electrophoretic dispersion liquid filled into the pixel areas.

Here, the lower interlayer 1140 is formed of an organic or inorganic material having electrical insulation.

Here, the lower interlayer 1140 may be formed in a coating or vacuum deposition process. The lower interlayer 1140 is formed with a thickness of 100 Å~10,000 Å. A material used to form the lower interlayer 1140 may be a single material or two or more materials. The lower interlayer 1140 prevents the charged particles 1150 from contacting the partition walls 1130 and the pixel areas 1120. The lower interlayer 1140 may be formed of the same material as the material used to form the partition walls 1130. For example, the lower interlayer 1140 may be formed of a polymer, acrylic UV curable resin, an organic material which can be coated to form an organic SAM layer or a non-conductive transparent material. Alternatively, the lower interlayer 1140 may be formed of an inorganic material. For example, the lower interlayer 1140 may be formed of $SiN_x$, a-Si, $SiO_x$, $Al_2O_3$ or a non-conductive transparent inorganic material. The electrophoretic dispersion liquid is configured of a plurality of charged particles 1150 and a dielectric solvent 1160. The electrophoretic dispersion liquid is filled into the pixel areas (the filled-cells) having the lower interlayer 1140 formed thereon.

Here, the electrophoretic dispersion liquid is filled according to a die coating method, a casting method, a bar coating method, a slit coating method, a dispense method, a squeezing method, a screen printing method, an inkjet printing method, or other suitable method. As mentioned above, the electrophoretic display device according to the second exemplary embodiment of the present invention having the electrophoretic dispersion liquid configured of the plurality of the charged particles 1150 and the dielectric solvent 1160 into the pixel areas (the filled-cells) having the lower interlayer 1140 formed thereon. With this process, the electrophoretic dispersion liquid is internalized on the lower substrate 1100.

Although not shown in the drawings, the electrophoretic dispersion liquid is injected into the pixel areas and after that, sealant configured to bond the lower and upper substrates 1100 and 1200 to each other is formed on the partition walls 1130. The sealant is formed of a non-conductive material that does not generate a chemical reaction with the charged particles 1150, thereby preventing loss of the charged property possessed by the charged particles 1150.

The upper substrate 1200 includes an upper base substrate 1210, a common electrode 1220 formed on the upper base substrate 1210 and an upper interlayer 1230. The upper interlayer 1230 is formed to prevent the loss of the charged property possessed by the charged particles 1150 of the electrophoretic dispersion liquid internalized on the lower substrate 1100. The upper interlayer 1230 formed of an organic or inorganic material having electric insulation is formed on the common electrode 1220.

The upper interlayer 1230 may be formed in the coating or vacuum deposition used to form the lower interlayer 1140 with a thickness of 100 Å~10,000 Å. The upper interlayer 1230 separates the charged particles 1150 from the common electrode 1220. Here, the upper interlayer 1230 may be formed of an organic material. For example, the upper interlayer 1230 may be formed of polymer, acrylic UV curable resin, an organic material which can be coated to form an organic SAM layer or a non-conductive transparent organic material. Alternatively, the upper interlayer 1230 may be formed of an inorganic material. For example, the upper interlayer 1230 may be formed of $SiN_x$, a-Si, $SiO_x$, $Al_2O_3$ or a non-conductive transparent inorganic material.

The upper interlayer 1230 enables the bonding to be performed smoothly between the lower and upper substrates 1100 and 1200 by the sealant formed on the partition walls 1130 of the lower substrate 1100. In addition, the upper interlayer 1230 can close the electrophoretic dispersion liquid internalized on the lower substrate 1100 to be sealed.

As mentioned above, the electrophoretic dispersion liquid may be closed in the hexahedron-shaped pixel areas (filled-cells) to be airtight by the upper interlayer 1230 and the lower interlayer 1140. As a result, the charged particles 1150 are physically isolated from the partition walls 1130, the pixel electrodes 1120 and the common electrode 1220.

Moreover, the structure that fills the electrophoretic dispersion liquid into the lower substrate 1100 may generate absorption and electrical interaction among the partition walls 1130, the pixel electrodes 1120, the common electrode 1220 and the charged particles 1150.

Specifically, the charged particles 1150 have a core-shell structure having an outer area including a charge coupled agent and organic polymer elements, to be charged positive (+) or negative (−).

As a result, when the partition walls 1130 formed of a polymer contacts the charged particles 1150, a same organic interaction (i.e., an interaction that results from being formed of the same organic material) between the partition walls 1130 and the charged particles 1150 may be generated because of the structure of the charged particles 1150.

For example, the charged particles 1150 may have a positive (+) ammonium or negative (−) salicylate salt structure. At this time, when the charged particles 1150 contact the partition walls 1130 in a high chemical activity, the same organic interaction is generated. Because of the same organic interaction, the charged particles 1150 would adhere to the partition walls 1130 resulting in a loss of the charged property.

If the pixel electrodes 1120 and the common electrode 1220 formed of the inorganic material contact the charged particles 1150, the charged property of the charged particles 1150 could be lost to either the pixel electrodes 1120 or the common electrode 1220.

If the charging property of the charged particles 1150 is lost, the electrophoretic display device will not operate normally and the image will not be displayed.

To prevent this problem, the second exemplary embodiment presents the non-conductive lower interlayer 1140 formed on the inner wall of the partition walls 1130 and the pixel electrodes 1120. Together with the lower interlayer 1140, the upper interlayer 1230 is formed on the common electrode 1230. As a result, the charged particles 1150 filled in the pixel areas may be isolated from the partition walls 1130, the pixel electrodes 1120 and the common electrode 1220 do not contact them.

Loss of charged property of the charged particles 1150 can be prevented in the described structure that internalizes the electrophoretic dispersion liquid on the lower substrate 1100.

Furthermore, a driving ability of the charged particles 1150 filled in the pixel areas, contrast and reflectance may be heightened and a display quality of the electrophoretic display device is enhanced accordingly.

FIGS. 9 to 15 are diagrams illustrating a method for manufacturing the electrophoretic display device according to the second exemplary embodiment of the present invention. As follows, the manufacturing method of the electrophoretic display device according to the second embodiment will be described with reference to FIGS. 9 to 15.

Figure 9:
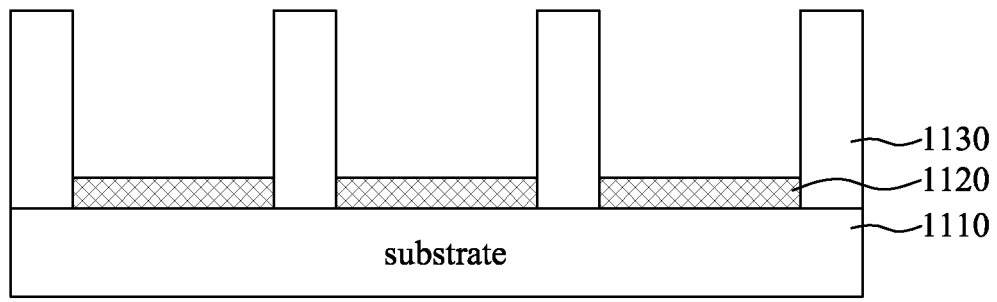
FIGS. 9 to 15 are diagrams illustrating a method for manufacturing the electrophoretic display device according to the second exemplary embodiment of the present invention.

As shown in FIG. 9, a conductive layer is formed on the lower base substrate 1110 and the conductive layer is patterned thereafter, thereby forming the pixel electrodes 1120 on the pixel areas, respectively. Then, an organic material is coated on the lower base substrate 1110 having the pixel electrodes 1120 formed thereon and the coated organic material is patterned, to form the partition walls 1130 surrounding the pixel electrodes 1120.

Figure 10:
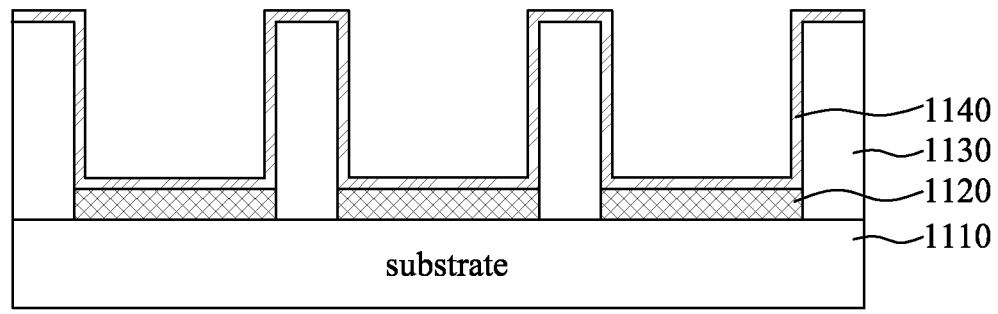

As shown in FIG. 10, the lower interlayer 1140 is formed on inner walls of the partition walls 1130 and the pixel electrodes 1120. Here, the lower interlayer 1140 is formed to isolate the electrophoretic dispersion liquid filled into the pixel areas defined by the partition walls 1130 from the pixel electrodes 1120 and the partition wall 1130. The lower interlayer 1140 is formed in the coating or vacuum deposition process, to have a thickness of 100 Å~10,000 Å. At this time, the material used to form the lower interlayer 1140 may be formed of two or more materials.

Here, the lower interlayer 1140 may be formed of an organic or inorganic material which is electrically insulative. For example, the lower interlayer 1140 may be formed of polymer, acrylic UV curable resin, an organic material which can be coated to form an organic SAM layer or a non-conductive transparent material. Alternatively, the lower interlayer 1140 may be formed of an inorganic material. For example, the lower interlayer 1140 may be formed of $SiN_x$, a-Si, $SiO_x$, $Al_2O_3$ or a non-conductive transparent inorganic material.

As mentioned above, the non-conductive lower interlayer 1140 is formed on the inner walls of the partition walls 1130 and the pixel electrodes 1120 to surrounding the electrophoretic dispersion liquid filled into the pixel areas.

Figure 11:
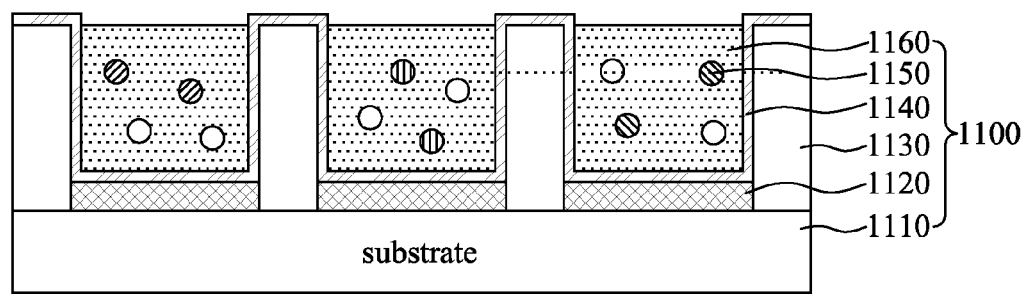

After that, as shown in FIG. 11, the electrophoretic dispersion liquid is filled into each of the pixel areas (the filled-cells) having the lower interlayer 1140 formed thereon. If the electrophoretic display device presents full colors, the charged particles 1150 may be colored with corresponding colors, which will be displayed by the cells, respectively. In this case, the filling process of the electrophoretic dispersion liquid may be performed dividedly for every color of the colored charged particles 1150.

Through the manufacture process shown in FIGS. 9 to 11, the lower substrate 1100 is manufactured.

Figure 12:
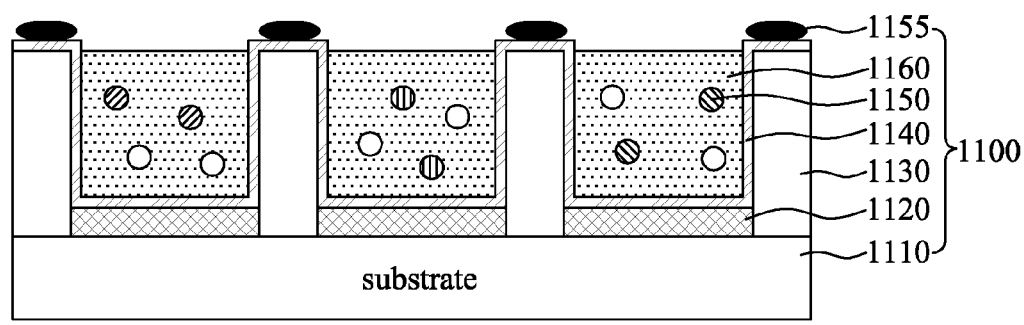

As shown in FIG. 12, the sealant 1155 is formed on the partition wall 1130 to bond the lower and upper substrates 1100 and 1200 to each other. At this time, the sealant 1155 is formed of a non-conductive material that does not generate a chemical interaction with the charged particles 1150, thereby preventing the charged property of the charged particles 1150 from being lost.

Figure 13:
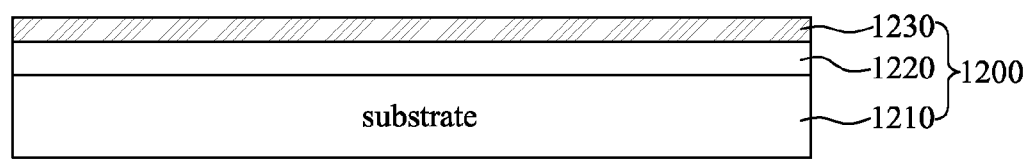

Meanwhile, the upper substrate 1200 may be manufactured in a separate process from the manufacture process of the lower substrate 1100. Specifically, as shown in FIG. 13, a conductive transparent material is used to form the common electrode 1220 on the upper base substrate 1210.

After that, an electrically insulative organic or inorganic material is coated on the common electrode 1220, thereby forming the upper interlayer 1230. At this time, the upper interlayer 1230 is formed to be transparent. Here, the upper interlayer 1230 prevents the loss of the charged property possessed by the charged particles 1150 internalized on the lower substrate 1100.

The upper interlayer 1230 is formed in the same coating or vacuum deposition process as the lower interlayer 1140 with a predetermined thickness of 100 Å~10,000 Å. The charged particles 1150 are prevented from contacting the common electrode 1220 by the upper interlayer 1230. Here, the upper interlayer 1230 may be formed of an organic material, for example.

The upper interlayer 1230 may be formed of an organic material. For example, the upper interlayer 1230 may be formed of polymer, acrylic UV curable resin, an organic material which can be coated to form an organic SAM layer or a non-conductive transparent organic material. Alternatively, the upper interlayer 1230 may be formed of an inorganic material. For example, the upper interlayer 1230 may be formed of $SiN_x$, a-Si, $SiO_x$, $Al_2O_3$ or a non-conductive transparent inorganic material.

The upper interlayer 1230 enables the bonding to be smoothly performed between the lower and upper substrates 1100 and 1200 by the sealant formed on the partition walls 1130 of the lower substrate 1100. In addition, the upper interlayer 1230 enables the electrophoretic dispersion liquid internalized on the lower substrate 1100 to be airtight.

Figure 14:
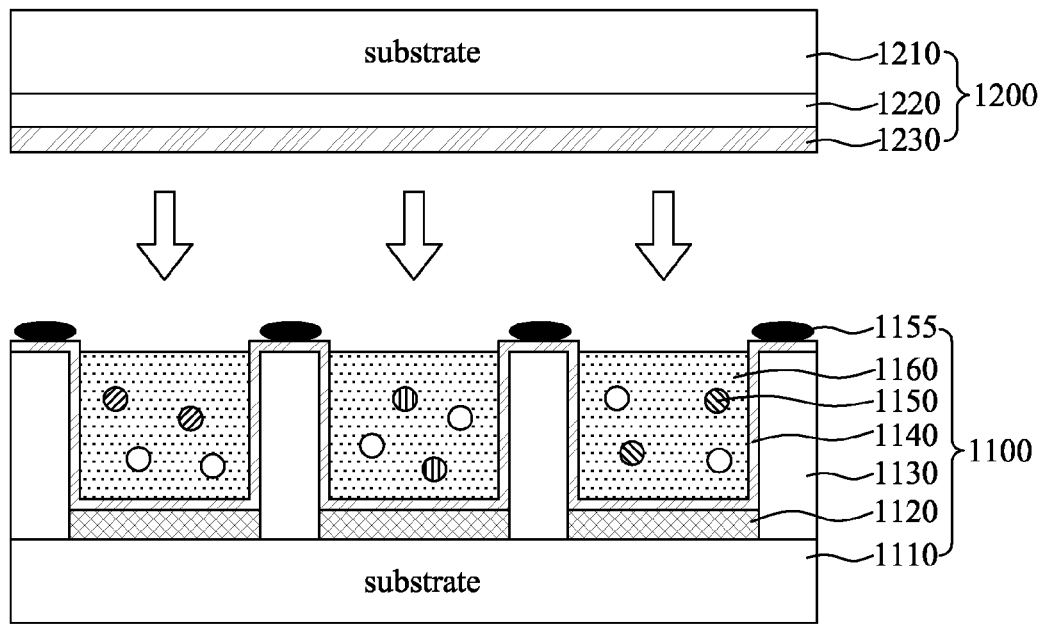

As shown in FIG. 14, the upper substrate 1200 and the lower substrate 1100 are bonded to each other. At this time, the bonding between the upper and lower substrates 1200 and 1100 may be performed in a pressing process by applying a pressure to the substrates 1200 and 1100. Together with the pressing process, an annealing process applying a temperature may be performed.

Figure 15:
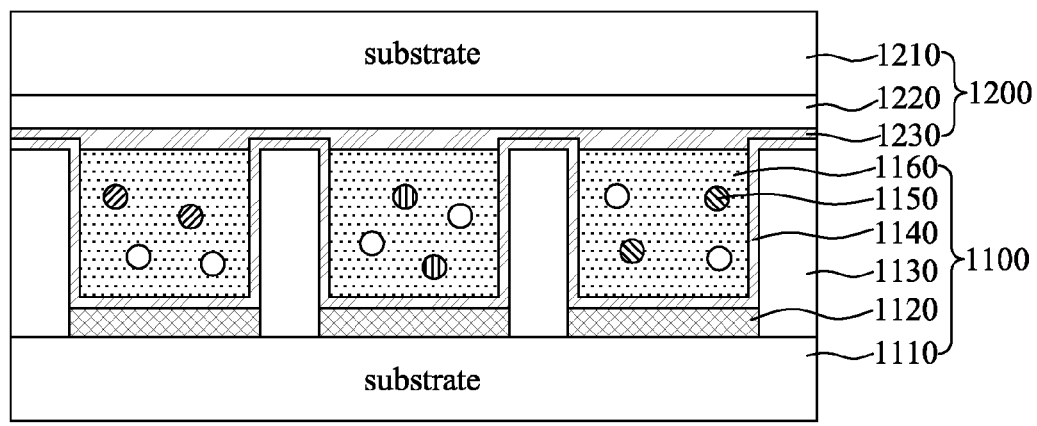

Through the manufacturing process described above, the electrophoretic display device including the lower interlayer 1140 and the upper interlayer 1230 may be manufactured as shown in FIG. 15.

The electrophoretic display device according to the second exemplary embodiment of the present invention may prevent loss of the charged property of the charged particles filled into the pixel areas.

The above exemplary embodiment provides the sealant 1155 formed on the partition walls 1130 of the lower substrate 1100 to bond the lower substrate to the upper substrate 1200. According to a further exemplary embodiment, the sealant may be formed on the upper substrate.

In this case, the sealant 1155 is provided on a predetermined portion of the upper substrate 1200 which corresponds to the partition walls 1130 of the lower substrate 1100. After that, the lower substrate 1100 and the upper substrate 1200 may be bonded to each other.

According to a still further embodiment, the sealant 1155 is provided in an outer portion of a display area formed on the upper substrate 1200 and the bonding between the lower and upper substrates 1100 and 1200 may be performed after that.

The electrophoretic display device manufactured according to the manufacture process improves driving stability and reliability of the electrophoretic dispersion liquid internalized on the lower substrate. As a result, reflectance and contrast may be enhanced.

The method for manufacturing the electrophoretic display device according to the embodiments of the present invention may advantageously utilize the manufacture infrastructure used to manufacture conventional liquid crystal display devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. An electrophoretic display device, comprising:
   a lower substrate having a plurality of pixel electrodes and partition walls thereon, the partition walls surrounding the pixel electrodes to define a plurality of sub-pixels, and a lower interlayer formed on the pixel electrodes and the partition walls;

an upper substrate bonded with the lower substrate, the upper substrate having a common electrode formed thereon with an upper interlayer on the common electrode; and electrophoretic dispersion liquid comprising a plurality of charged particles colored to display colors, the electrophoretic dispersion liquid disposed in the plurality of the sub-pixels defined by the pixel electrodes and surrounded by the partition walls;

a sealant disposed between the lower interlayer and the upper interlayer;

wherein the sealant is disposed in a portion corresponding to tops of the partition walls, wherein the electrophoretic dispersion liquid is separated from the pixel electrodes and the partition walls physically by the lower interlayer, and the electrophoretic dispersion liquid is separated from the common electrode by the upper interlayer, wherein the upper and lower interlayers are formed of organic materials, wherein the lower interlayer and the upper interlayer are overlapped and bonded by the sealant, in the portion corresponding to each of the tops of the partition walls.

2. The electrophoretic display device of claim 1, wherein lower and upper interlayers are formed of a polymer, acrylic UV curable resin, or an organic material which can be coated to form an organic self-assembled monolayer (SAM) film or a non-conductive transparent material.

3. The electrophoretic display device of claim 1, wherein the lower and upper interlayers include of one of $SiN_x$, a-Si, $SiO_x$, and $Al_2O_3$ covered with an organic material.

4. The electrophoretic display device of claim 1, wherein the lower and upper interlayers is formed with a thickness of 100 Å to 10,000 Å.

* * * * *